Figures 1, 2:
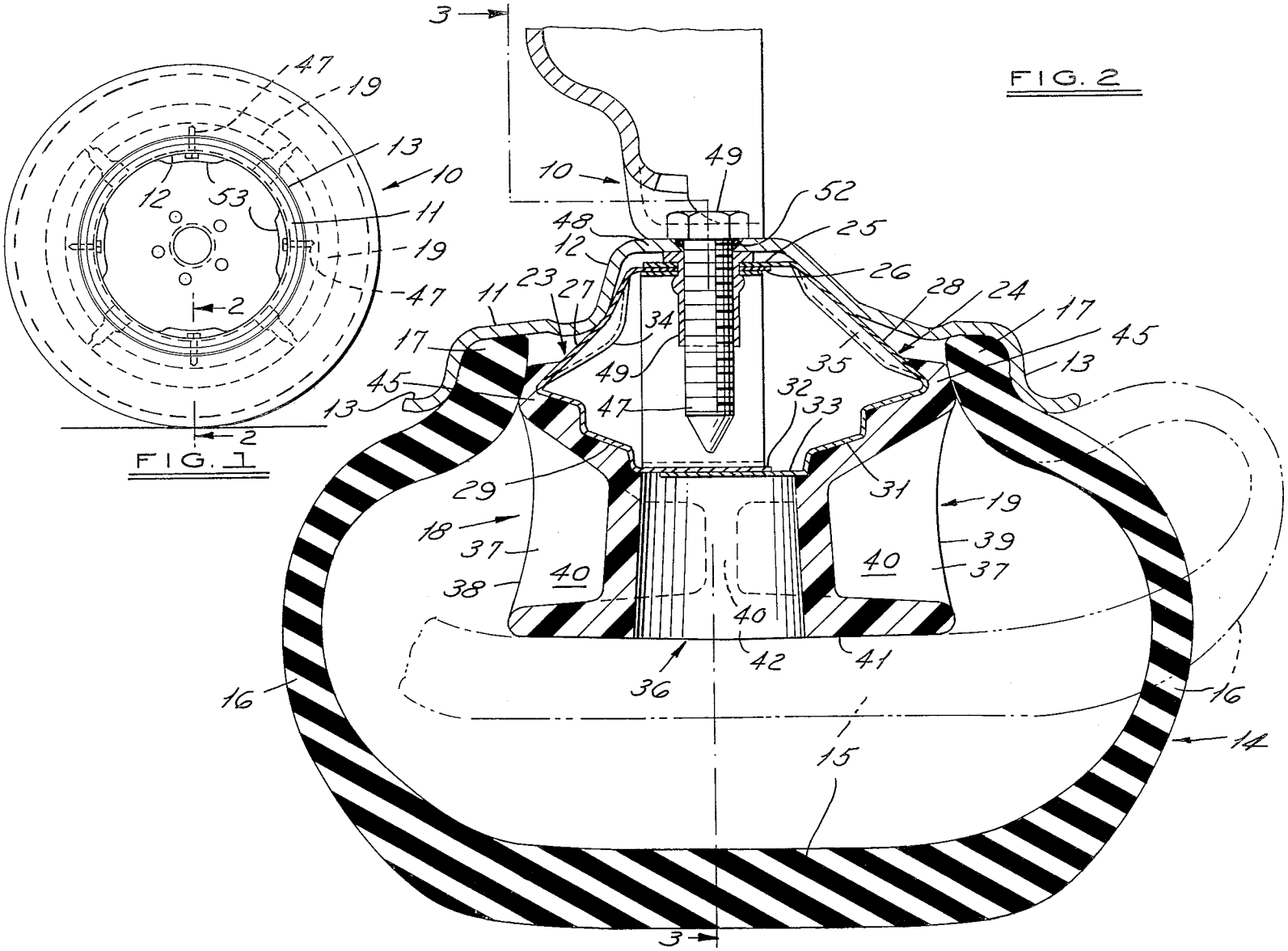

United States Defensive Publication [19] (H) [11] T963,004

Van Wicklin, Jr. [43] Oct. 4, 1977

[54] RUN-FLAT SYSTEM FOR A VEHICLE WHEEL

[75] Inventor: Warren A. Van Wicklin, Jr., Dearborn, Mich.

[73] Assignee: Ford Motor Company, Dearborn, Mich.

[21] Appl. No.: 772,401

[22] Filed: Feb. 28, 1977

Related U.S. Application Data

[63] Continuation of Ser. No. 670,476, March 25, 1976.

[51] Int. Cl.[2] ..... B60C 17/00

[52] U.S. Cl. ..... 152/158; 152/330 RF; 152/400

[57] ABSTRACT

A run-flat system comprising, in combination, a vehicle wheel having a tubeless tire mounted thereon and a run-flat support structure within the tire comprising a plurality of arcuate segments interposed between the rim of the wheel and the tread section of the tire. The segments are fastened to the rim and in normal inflated condition of the tire are radially spaced from the tire tread section. The improvement comprises each arcuate segment having an elongated hollow base section seated in the drop center channel of the wheel rim, side walls extending outwardly from the base wall toward the tubeless tire retention beads, and a compression resistant wall spanning the segment base section side walls. An energy absorbent elastomeric arcuate liner externally covers the upper section of the segment base section, the liner extending over the side edges of the segment base section in abutting relation to the retention beads to compress the latter against the retention flanges of the rim.

4 Claims, 2 Sheets Drawing,

10 Pages Specification

The file of this unexamined application may be inspected and copies thereof may be purchased (849 O.G. 1221, Apr. 9, 1968).

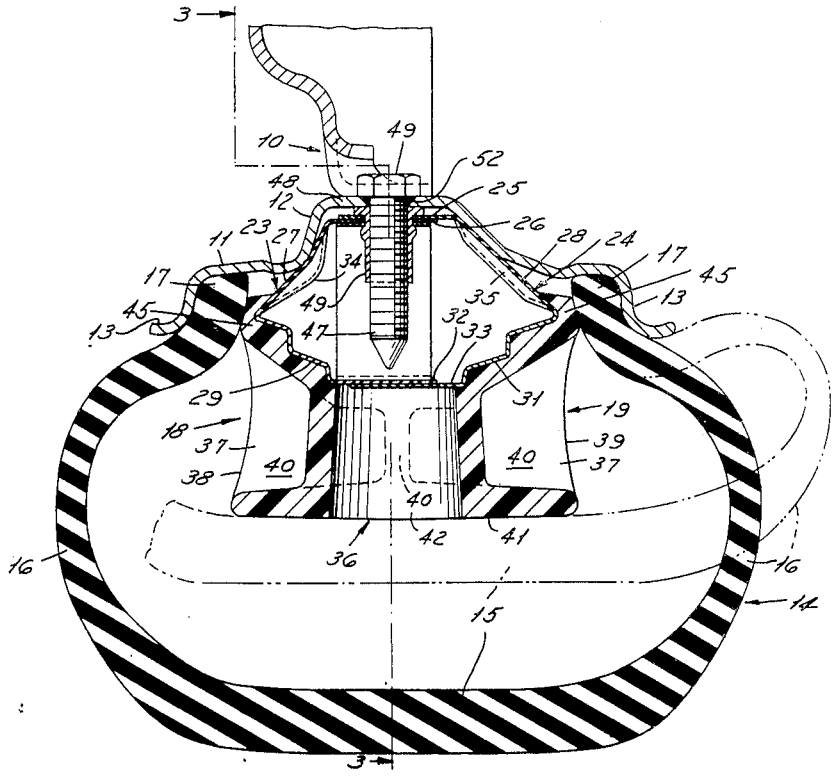

FIG.4
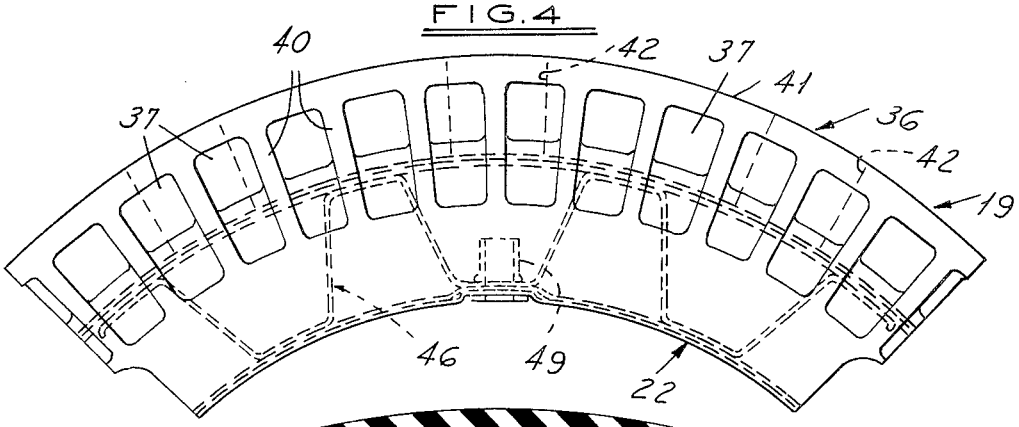
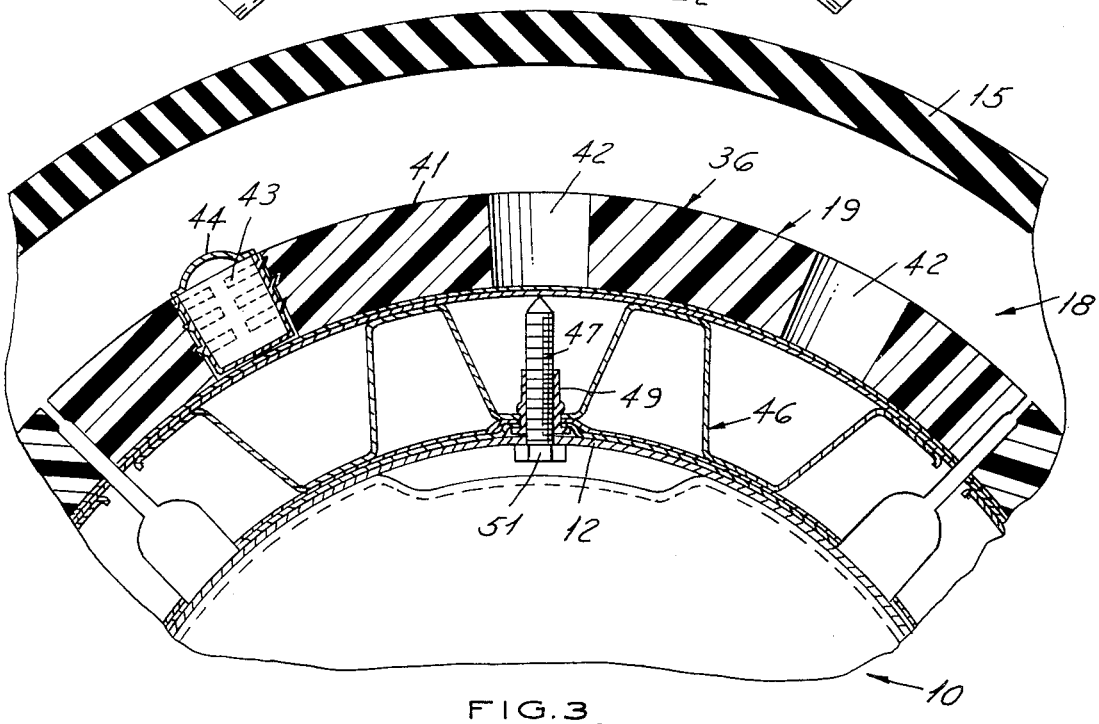
FIG.3
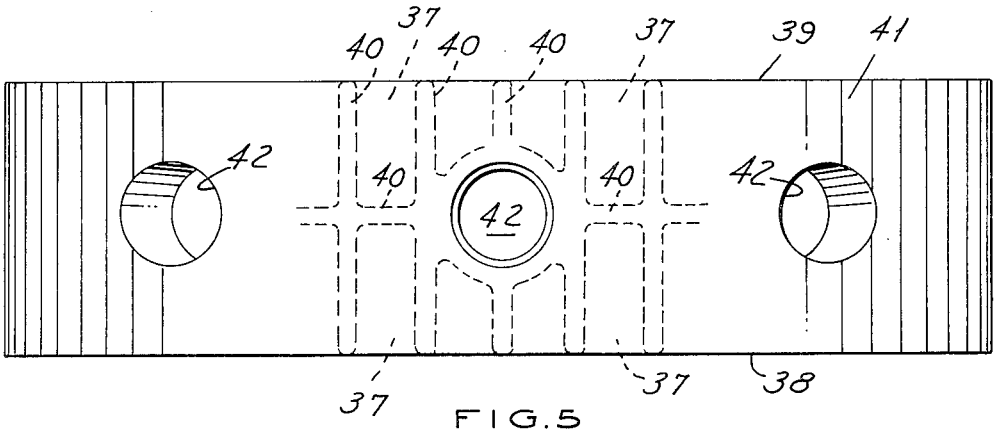
FIG.5